No. 793,228. PATENTED JUNE 27, 1905.
G. H. RICKE.
FRUIT JAR.
APPLICATION FILED MAR. 7, 1905.
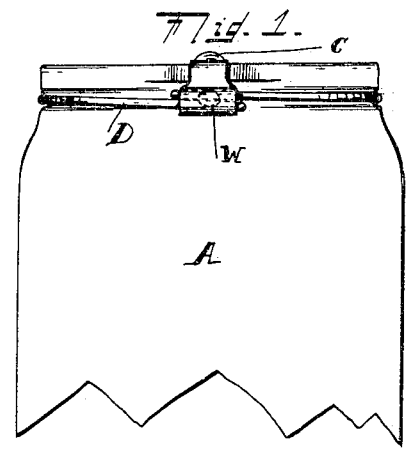
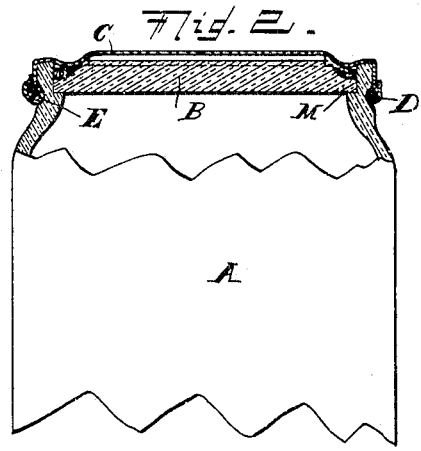
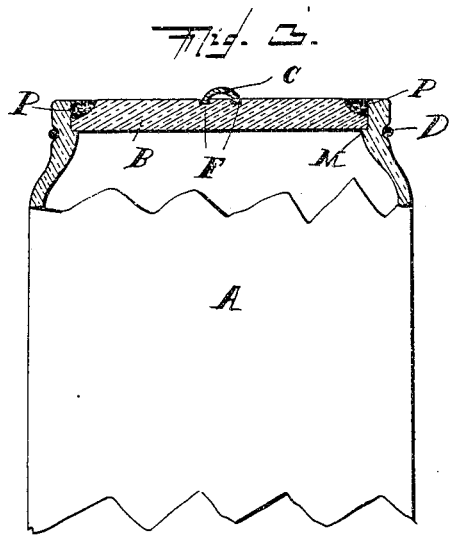
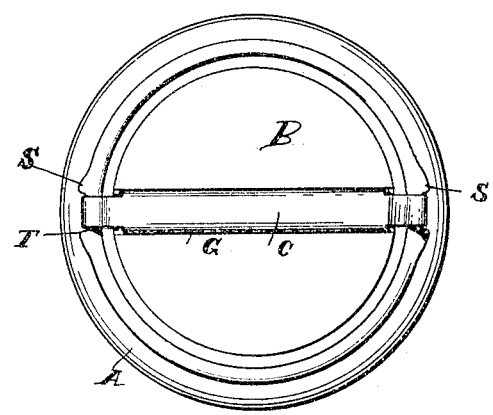
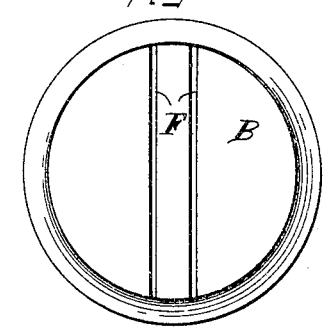
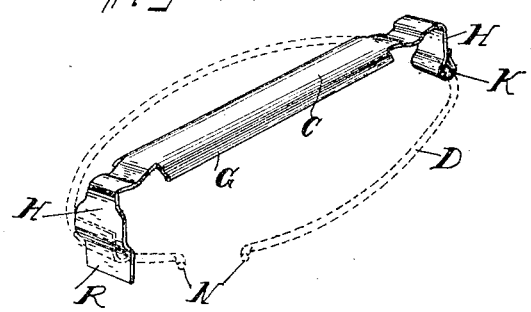

No. 793,228. Patented June 27, 1905.

UNITED STATES PATENT OFFICE.

GEORGE H. RICKE, OF CINCINNATI, OHIO, ASSIGNOR TO RICHARD M. ATKINS, OF SOUTH NORWOOD, OHIO.

FRUIT-JAR.

SPECIFICATION forming part of Letters Patent No. 793,228, dated June 27, 1905.

Application filed March 7, 1905. Serial No. 248,949.

*To all whom it may concern:*

Be it known that I, GEORGE H. RICKE, a citizen of the United States, residing at the city of Cincinnati, in the county of Hamilton and State of Ohio, have invented certain new and useful Improvements in Fruit-Jars, of which the following is a specification.

The object of my invention is to produce a simple, cheap, and efficient fruit-jar in which the fruit or preserves will not come in contact with metal. I dispense with rubber gaskets and screw-caps and other objectionable means of forming the closure on fruit-jars. When rubber gaskets are used, if the pressure is not even and uniform on the gasket air-holes will form and the fruit will become moldy or spoil. Screw-caps are hard to take off, a tool often being necessary to do the work. The seal is by no means perfect. The use of wire to hold the lid is objectionable, as the wire bends, leaves its place, and becomes rusty and loose. I overcome all these objections and produce a jar into which the lid can be tightly and permanently sealed. No air can enter. It is neat in appearance, can be easily put in place and removed, is certain in action, and no rubber gaskets are needed. Its efficiency and advantages will readily become apparent from the following description.

Figure 1 is a view in elevation of my new "fruit-jar," the jar being broken away at the bottom. Fig. 2 is a section of the jar at the top and through the lid and holding devices, taken longitudinally of the holding devices, the jar being partly broken away. Fig. 3 is a section of the jar at the top and through the lid and lid-holding devices, taken at a cross-section through said holding devices, the jar being partly broken away. Fig. 4 is a top view of the jar, lid, and holding devices. Fig. 5 is a top view, the same as shown in Fig. 4, except that the holding devices are removed. Fig. 6 is a detached view of the lid-holding device, the spring retaining-ring which encircles the jar at the neck being shown in dotted lines, the view showing the retainer ready to be placed on the jar. Fig. 7 is a fragmentary view showing how the ends of the spring-ring fit about and in the end of that part of the lid-holding device which fits across the cap or lid.

A represents the jar-body; B, the lid; C, the lid holder or strip which passes over the lid and down over the sides of the mouth of the jar, and D the spring retaining or locking wire or ring which holds the strip or holder C down and in place and the lid in the jar-mouth. The neck of the jar is provided near its top with an encircling groove or depression E, into which the retaining-ring D fits. This groove E is widened at one side of the jar where the meeting ends of the ring D meet, so that these ends will lie flush and in juxtaposition and also form a proper appearance. (See particularly Figs. 1, 2, and 7.) The lid B has two grooves F crossing its face, as shown.

The lid-holder C is formed of a convex part G (being that part which lies on the lid) and two depending ears or extensions H, which fit over the mouth of the jar at its edge, and at their extremities partly fit in the groove E, forming eyes or hooks, as K, into which the spring or retaining wire D fits and rests and by which it is held from upward and downward or any lateral movement, of course the ring D, itself being made of spring wire or metal, acting as a retainer to pull down the holder C, so that its edges will fit the grooves F in the lid and hold the ears H snugly and properly in place, so that the lid is held firmly in place on the shoulder M in the jar-mouth. The edges of the concave part G of the holder C, fitting into the grooves F, keeps the lid B from turning. The spring retaining-ring D has its ends provided with hooks or tangs N, which fit over the edge of the ear H on that side of the jar where these meeting ends of the ring D come together.

The closure can be placed on the jar in various ways; but I will describe one specific way: The jar is filled with fruit or preserves. The lid B is placed on the shoulder M. The holder C is put in place, its edges (of the part G) fitting the grooves F in the lid, the ears H slipping over the edge of the jar-mouth, the eye K finding the groove E, the spring retaining-wire D being now slipped on or having been put on when the strip or holder C and its ears were slipped on, the meeting ends of wire D meeting at the widened part of the groove, so that they can lie next to each other and flush, the hooks N N fitting over the edge of the ear on opposite sides. The ear H where the groove is widened and where these ends of the ring D meet is then bent up to form an eye, as K, on the opposite side of the jar. The spring-retainer D thus holds and locks the parts firmly in position, allowing no movement of any kind, and in connection with a paraffin seal P makes a hermetically-sealed jar. In Fig. 6 it will be seen at point R, where the ear H appears before it is turned up, as above described.

The grooves in the lid can be made in any other manner and be of any shape. The lid can be made of any form and rest in or on the jar-mouth in any desired manner. The convex part of the lid-holder can be differently shaped or made flat, its ears can be of any shape and the ring D retained in them in any other desired manner. The spring-ring encircling the neck of the jar can be made of any shape, contour, and held in place as desired. A seal other than paraffin may be used and placed in the jar in any desired way. The parts may be made out of any desired material.

If desired, I may widen the neck of the jar at the points where the ears H fit over it and form a recess in such widened part to keep the parts from slipping. This is shown in Fig. 4, where this widened part is marked S and the recess is marked T.

What I claim as new and of my invention, and desire to secure by Letters Patent, is—

1. In a fruit-jar, the body of the jar, a lid, said lid fitting the mouth of the jar, a strip, said strip passing over the lid, and over the edges at the mouth of the jar, in combination with a spring retaining-ring to hold the said strip and lid in place, as and for the purposes set forth.

2. In a fruit-jar, the body of the jar, a lid, said lid fitting the mouth of the jar, a strip, said strip passing over the lid and over the edges at the mouth of the jar, in combination with a spring retaining-ring, having its ends turned, to hold the said strip and lid in place, as and for the purposes specified.

3. In a fruit-jar, the body of the jar, a lid, said lid fitting the mouth of the jar, said lid provided with a recess, a strip, said strip passing over said lid, (in said recess,) and over the edges at the mouth of the jar, in combination with a spring retaining-ring to hold the said strip and lid in place, as and for the purposes set forth.

GEORGE H. RICKE.

Witnesses:
 W. F. LAW,
 JOHN J. MULVANEY.